UNITED STATES PATENT OFFICE.

MAURICE VALENTINE HITT, OF PARLIN, NEW JERSEY, ASSIGNOR TO E. I. DU PONT DE NEMOURS AND COMPANY, OF WILMINGTON, DELAWARE, A CORPORATION OF DELAWARE.

PROCESS OF PRODUCING PYROXYLIN BODIES.

1,321,633.     Specification of Letters Patent.     Patented Nov. 11, 1919.

No Drawing. Application filed December 10, 1917, Serial No. 206,438. Renewed June 24, 1919. Serial No. 306,434.

*To all whom it may concern:*

Be it known that I, MAURICE VALENTINE HITT, of Parlin, in the county of Middlesex, and in the State of New Jersey, have invented a certain new and useful Improvement in Processes of Producing Pyroxylin Bodies, and do hereby declare that the following is a full, clear, and exact description thereof.

The object of my invention is to provide a process of forming pyroxylin bodies, by using a pyroxylin solvent having among others, the qualities of being cheap, of high solvent power, of being free from precipitation of pyroxylin, non-hygroscopic, adapted to form a very fluid but cohesive solution, and of pleasant odor. A further object is to use a solvent composition containing constituents, which have approximately the same vapor tension, as it is desirable to have a number of the constituents evaporate more or less simultaneously. A further object is to provide a solvent composition which by reason of the presence of the alcohol therein can be regulated as to its fluidity by varying the quantity of the alcohol as compared with the quantity of solid constituents therein.

In the pyroxylin industries, such as in the manufacture of lacquers, artificial leather, varnishes, etc., there is a demand for a solvent having the above stated qualities. None of the ordinary pyroxylin solvents, such as glacial acetic acid, amyl acetate, and acetone including their homologues and derivatives, has all of these properties, in the highest degree except perhaps amyl acetate, the price of which is prohibitive. In these several industries, it is desirable to vary the relative proportions of the solvent and pyroxylin to obtain a solution of the strength desired according to the nature of the pyroxylin film to be formed. For example, in lacquer work, the solution ordinarily does not contain over five ounces of pyroxylin per gallon in order that a film of proper thickness may be deposited. In some of the decorative arts, a very heavy film is employed which can be deposited from a solution containing as high as twenty ounces of pyroxylin per gallon. There is thus for each industry a strength of solution which is best adapted thereto. Where a solution is desired having less pyroxylin than the total amount which the solvent is capable of taking up (for instance, if a solution of twenty ounces of pyroxylin to a gallon of solvent were desired, which is less than the total amount which the solvent would take up), it is unnecessary to have the entire quantity of solution composed of pure solvent, it only being necessary to have enough solvent present to dissovlve the desired amount of pyroxylin. For economy, therefore, it is customary to add cheap diluents to the solvent, which diluents are either entirely non-solvent or nearly so. The use of diluents, however, introduces difficulties, among which may be mentioned the following:—When, as used in a factory, these solvents are evaporated at the ordinary room atmosphere in order to deposit a film of pyroxylin, there is a tendency, except in the case of those solvents which are non-hygroscopic but expensive such as amyl acetate, toward a separation out of the nitrocellulose or other solvents through absorption of moisture from the air or through the change in the composition of the solvent mixture resulting from the unequal rate of evaporation of its components, this precipitation being usually evidenced by the appearance of a whitish substance, technically known as "blushing" or "blooming", or by the settling to the bottom of a jelly-like mass. Such separation tends to decrease the strength of the film and, in some cases, the white appearance produces objectionable color effects.

I have discovered that by using a mixture of ethyl acetate and ethyl or methyl alcohol as the solvent and benzol as the diluent (with or without other components), a mixture is obtained which has a maximum solvent power and in which there is no tendency for the pyroxylin to precipitate. Such mixture is also comparatively non-hygroscopic. When these materials are mixed together, the solvent power of the more active solvent ethyl acetate, is retained so that the mixture may contain as high as seventy per cent., or even more, of benzol. I find that during evaporation under ordinary factory conditions, the ethyl acetate, ethyl or methyl alcohol and benzol mixture deposits a film which is strong and transparent. For example, my invention may be carried out by using a solvent comprised of 41 parts by weight of ethyl acetate, 50 parts by weight of benzol, and 9 parts by weight of ethyl or methyl alcohol, having dissolved therein a quantity of nitrocellulose in the proportion of two pounds of nitrocellulose to seven pounds of the solvent mixture. But the relative percentages of these ingredients may vary widely according to the conditions covering the innumerable uses to which the solution may be put. I have given specific instances merely by way of illustration, and am not to be confined to the particular proportions given, as they are to be regarded as typical only. An increase in the benzol component results in reduced cost, and its disadvantage lies in the less rapid solvent action which such a mixture possesses. The fluidity can be varied by varying the quantity of the alcohol. Numerous other substances, such as oils, pigments, gums, resins, etc., may be added to the pyroxylin mixture, each having its own properties, and these properties will, of course, affect the properties of the final mixture, but the general principle will still obtain. Furthermore, instead of the benzol I may use other homologous benzene hydrocarbons, such for example, as toluol; either benzol or toluol may be referred to as a lower member of the benzene series of hydrocarbons. Also in the place of ethyl alcohol, I may use another volatile saturated aliphatic alcohol such, for example, as methyl alcohol.

As the boiling points of the liquid constituents are in the same neighborhood, it is not necessary to raise the temperature of any one much above another in order to secure evaporation of the solvent portion of the solution. This has the advantage that the vapor tension of no one of the evaporating constituents is higher than is necessary to produce evaporation of that particular constituent. This low vapor tension in evaporation is very desirable since the evaporation usually takes place within an apparatus which is large, and there is a tendency for the vapor to escape from the apparatus if the vapor tension is at all high.

I find that my mixture is comparatively non-hygroscopic, which is a very desirable quality, since the absorption of water in such a solution results in a precipitation of the pyroxylin.

I find also that the presence of the alcohol causes the benzol to be evaporated earlier than would otherwise be the case. In the evaporation of the solvent composition the alcohol, benzol and ethyl acetate would first evaporate together until the alcohol has substantially entirely evaporated thereafter the benzol and ethyl acetate would evaporate together until all of the benzol has evaporated and finally only ethyl acetate would be left. By the presence of the alcohol the residue of ethyl acetate is obtained more quickly as the benzol evaporates more quickly than if the alcohol were not present.

While I have described my invention above in detail, I wish it to be understood that many changes may be made therein without departing from the spirit of my invention.

I claim:

1. The process which comprises forming a body of pyroxylin by dissolving pyroxylin in a mixture of ethyl acetate, a lower member of the benzene series of hydrocarbons, and a saturated aliphatic alcohol whose rate of evaporation is somewhat similar to that of the other constituents, and then evaporating the solvent mixture.

2. The process which comprises forming a body of pyroxylin by dissolving pyroxylin in a mixture of ethyl acetate, benzol, and a saturated aliphatic alcohol whose rate of evaporation is somewhat similar to that of the other constituents, and then evaporating the solvent mixture.

3. The process which comprises forming a body of pyroxylin by dissolving pyroxylin in a mixture of ethyl acetate, a lower member of the benzene series of hydrocarbons, and ethyl alcohol and then evaporating the solvent mixture.

4. The process which comprises forming a body of pyroxylin by dissolving pyroxylin in a mixture of ethyl acetate, benzol and ethyl alcohol, and then evaporating the solvent mixture.

5. The process which comprises forming a body of pyroxylin by dissolving pyroxylin in a mixture of ethyl acetate, a lower member of the benzene series of hydrocarbons, and a volatile constituent adapted to rapidly evaporate the benzene hydrocarbon, and then evaporating the solvent mixture.

6. The process which comprises forming a body of pyroxylin by dissolving pyroxylin in a mixture of ethyl acetate, benzol, and a volatile constituent adapted to rapidly evaporate the benzene hydrocarbon, and then evaporating the solvent mixture.

7. The process which comprises forming a body of pyroxylin by dissolving pyroxylin in a mixture of ethyl acetate, a lower member of the benzene series of hydrocarbons, and a volatile constituent adapted to rapidly evaporate the benzene hydrocarbon, having substantially the same vapor tension as the other solvent constituents, and then evaporating the solvent mixture.

8. The process which comprises forming a body of pyroxylin by dissolving pyroxylin in a mixture of ethyl acetate, benzol, and a volatile constituent adapted to rapidly evaporate the benzene hydrocarbon, having substantially the same vapor tension as the other solvent constituents, and then evaporating the solvent mixture.

In testimony that I claim the foregoing I have hereunto set my hand.

MAURICE VALENTINE HITT.

Witnesses:
F. L. FULLAM,
G. B. FREEMAN.